US008635668B1

(12) United States Patent
Bank et al.

(10) Patent No.: US 8,635,668 B1
(45) Date of Patent: Jan. 21, 2014

(54) LINK ANALYSIS TOOL FOR SECURITY INFORMATION HANDLING SYSTEM

(75) Inventors: Judith Helen Bank, Morrisville, NC (US); Liam Harpur, Dublin (IE); Ruthie D. Lyle, Durham, NC (US); Patrick Joseph O'Sullivan, Dublin (IE); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/545,982

(22) Filed: Jul. 11, 2012

(51) Int. Cl.
  *H04L 29/06* (2006.01)
(52) U.S. Cl.
  USPC ............. 726/3; 726/12; 726/26; 726/27
(58) Field of Classification Search
  None
  See application file for complete search history.

(56) References Cited

U.S. PATENT DOCUMENTS

| | | | |
|---|---|---|---|
| 6,640,302 B1 | 10/2003 | Subramaniam | |
| 7,039,612 B1 | 5/2006 | Cook | |
| 7,117,284 B2 | 10/2006 | Watt | |
| 7,917,751 B2* | 3/2011 | Keohane et al. | 713/165 |
| 8,495,709 B1* | 7/2013 | Cooper et al. | 726/4 |
| 2004/0224771 A1 | 11/2004 | Chen | |
| 2006/0265737 A1* | 11/2006 | Morris | 726/3 |
| 2011/0126021 A1 | 5/2011 | Dhanda | |
| 2011/0225447 A1 | 9/2011 | Bostick | |

FOREIGN PATENT DOCUMENTS

| | | |
|---|---|---|
| JP | 2004334887 A | 11/2004 |
| WO | 03085931 A1 | 10/2003 |

OTHER PUBLICATIONS

Airdefense "Wi-Phishing and Evil Twins at Hotspots", AirDefense white paper, pp. 1-7, Copyright 2005.
Duke "CSL: Trusted and Untrusted Networks", downloaded from http://www.cs.duke.edu/csl/faqs/trust, on Jun. 28, 2012, pp. 1-2.
Kirk "'Evil twin' Wi-Fi access point proliferate", NetworkWorld, pp. 1-2, Apr. 25, 2007.
Motorola "Wireless Protection for the Mobile Enterprise", Motorola white paper, pp. 1-12, Jul. 2009.
Phifer "Top Ten Ways to Avoid an Evil Twin Attack", eSecurity Planet, pp. 1-3, Oct. 18, 2010.
Superuser "How can I determine which network adapter my browser is using? How can I change it?", Superuser, downloaded from http://superuser.com/questions/160637/how-can-i-determine-which-network-adapter-my-browser-is-using-how-can-i-change, on May 2, 2012, pp. 1-2.
Wiki "Evil twin (wireless networks)", Wikipedia, downloaded from http://en.wikipedia.orgiwiki/Evil_twin_%28wireless_networks%29, on May 2, 2012, pp. 1-3.

* cited by examiner

*Primary Examiner* — Minh Dinh
(74) *Attorney, Agent, or Firm* — David Mims; Mark P Kahler

(57) ABSTRACT

A security information handling system (IHS) receives a request to navigate to a webpage, such as a link, from a user IHS. A security IHS link analysis tool analyzes the link and determines if the link contains sensitive content. The security IHS link analysis tool transmits a network selection message to the user IHS indicating which network the user IHS should utilize based upon the content of the link.

15 Claims, 8 Drawing Sheets

US 8,635,668 B1

LINK ANALYSIS TOOL FOR SECURITY INFORMATION HANDLING SYSTEM

CROSS REFERENCE TO RELATED PATENT APPLICATIONS

This patent application is related to the copending patent application entitled "Network Selection Tool For Information Handling System" by Bank, et al., (Docket Number AUS920129241US1), filed concurrently herewith and assigned to the same Assignee, the disclosure of which is incorporated herein by reference in its entirely.

BACKGROUND

The disclosures herein relate generally to information handling systems (IHSs) that interact with other IHSs via a network connection. More specifically, the disclosure relates to an IHS that may connect to another IHS via multiple available networks.

BRIEF SUMMARY

In another embodiment, a security information handling system (IHS) is disclosed that includes a processor. The security IHS also includes a memory that is coupled to the processor. The memory is configured with a security IHS link analysis tool to receive a navigation request from a user IHS, the navigation request including a link. The memory is also configured to determine if a target of the link includes sensitive content. The memory is further configured to generate a non-secure network selection message if the target of the link is determined to not include sensitive content, wherein the non-secure network selection message designates a particular non-secure network for communication between the security IHS and the user IHS. The memory is still further configured to generate a trusted network selection message if the target of the link is determined to include sensitive content, wherein the trusted network selection message designates a trusted network for communication between the security IHS and the user IHS.

In yet another embodiment, a security IHS link analysis tool computer program product is disclosed that includes a non-transitory computer readable storage medium. The security IHS link analysis tool includes first instructions that receive a navigation request from a user IHS, the navigation request including a link. The security IHS link analysis tool also includes second instructions that determine if a target of the link includes sensitive content. The security IHS link analysis tool further includes third instructions that generate a non-secure network selection message if the target of the link is determined to not include sensitive content, wherein the non-secure network selection message designates a particular non-secure network for communication between the security IHS and the user IHS. The security IHS link analysis tool still further includes fourth instructions that generate a trusted network selection message if the target of the link is determined to include sensitive content, wherein the trusted network selection message designates a trusted network for communication between the security IHS and the user IHS. The first, second third and fourth instructions are stored on the non-transitory computer readable storage medium.

BRIEF DESCRIPTION OF THE DRAWINGS

The appended drawings illustrate only exemplary embodiments of the invention and therefore do not limit its scope because the inventive concepts lend themselves to other equally effective embodiments.

DETAILED DESCRIPTION

The disclosed user information handling system (IHS) includes a "user IHS link analysis tool" that intercepts requests to navigate to respective websites. These requests may include links. The user IHS link analysis tool transmits a link from such a request to a security IHS via a trusted network. A "security IHS link analysis tool" in the security IHS determines if the target of the link contains sensitive content. The security IHS link analysis tool also determines which network of multiple networks the user IHS should use to navigate to the target of the link and further creates a network selection message. The security IHS link analysis tool transmits the network selection message to the user IHS using the trusted network. The user IHS link analysis tool receives the network selection message and prompts the user to follow the network selection message to navigate to the target of the link using the preferred network of the network selection message or to override the network selection message and navigate to the target of the link using another network.

Figure 1:
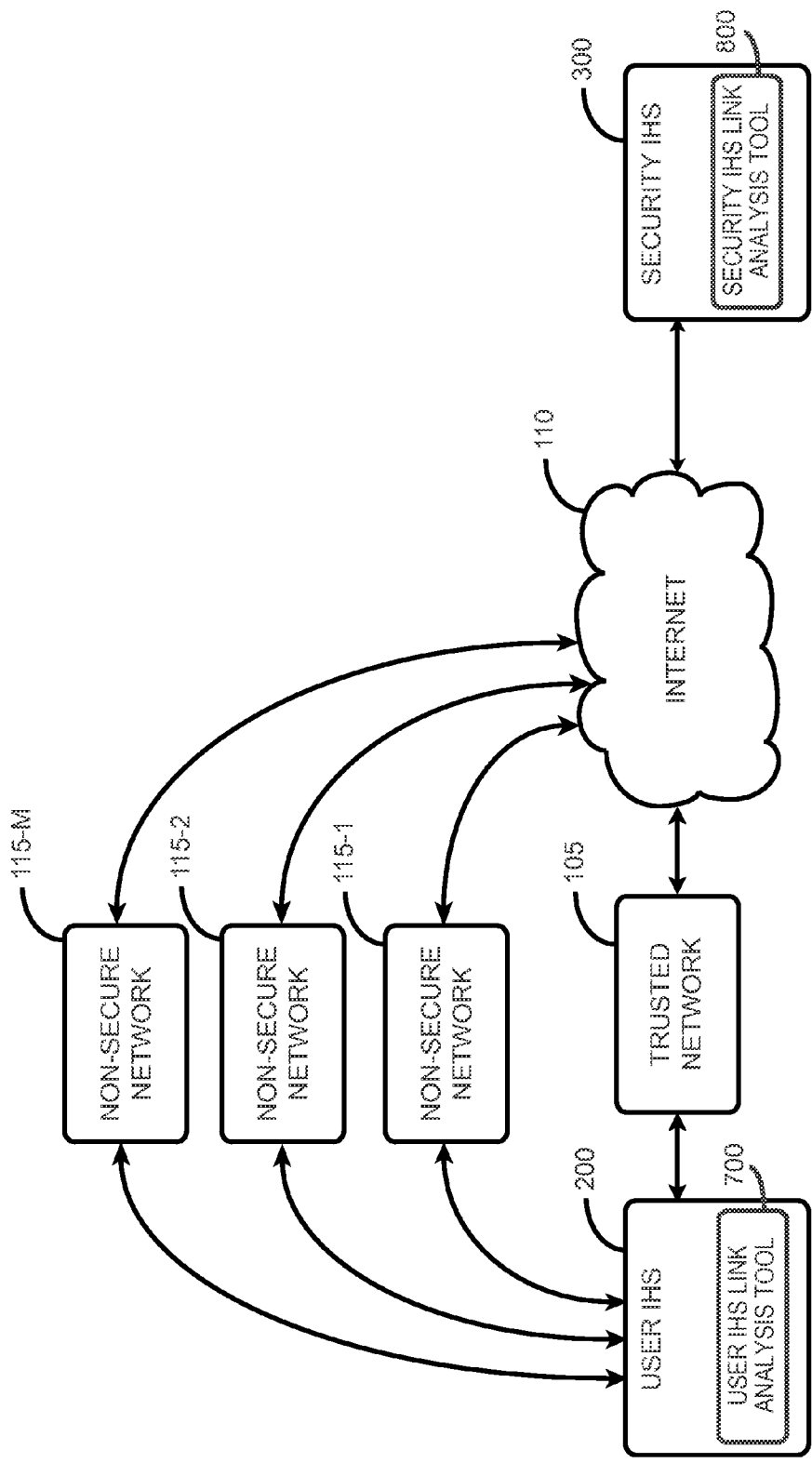
FIG. 1 is a block diagram of one embodiment of the disclosed network selection system.

FIG. 1 is a block diagram of one embodiment of a disclosed network selection system 100 that employs user IHS link analysis tool 700 and security IHS link analysis tool 800 to determine the appropriate network to employ for navigation to particular content. A user may employ a user IHS 200 in an attempt to navigate to the target of a link, for example, a webpage. The user IHS link analysis tool 700 intercepts the attempt to navigate to the target of a link and generates a navigation request. In one embodiment, the navigation request may contain the link, the current local time at user IHS 200, a list of networks available to user IHS 200 and other relevant data.

User IHS link analysis tool 700 transmits the navigation request over trusted network 105 via the Internet 110 to security IHS 300. Trusted network 105 may be a network connection over which the user has some control, for example an Internet service provider (ISP) or a cellular communications carrier. In one embodiment, a trusted network is a network that includes at least some security features. A trusted network may also be a network that the user or others regard as secure, or that is generally accepted as secure. Security IHS link analysis tool 800 receives the navigation request from user IHS 700 and navigates to the target of the link contained therein. Security IHS link analysis tool 800 parses the target of the link and determines if the target of the link contains sensitive content. A representative process of determining if the target of the link contains sensitive content is described in detail below. The security IHS link analysis tool 800 generates a network selection message that specifies which one of the available networks that user IHS 200 should employ to navigate to the target of the link. In other words, the network selection message may specify one of trusted network 105, non-secure network 115-1, non-secure network 115-2, . . . , and non-secure network 115-M, for use by user IHS 200 to navigate to the target of the link.

The security IHS link analysis tool 800 transmits the network selection message via the Internet 110, through trusted network 105 to user IHS 200. In one embodiment, the user IHS link analysis tool 700 receives the network selection message and navigates to the target of the link using the network that the network selection message specifies. In one embodiment, trusted network 105, non-secure network 115-1, non-secure network 115-2, . . . , non-secure network 115-M may include wired and/or wireless networks. For example, non-secure network 115-1 could be a Wi-Fi hotspot at a coffee shop where the user is not in control of the network. In another example, non-secure network 115-2 could be a business network where the user is not in control of the network.

Figure 2:
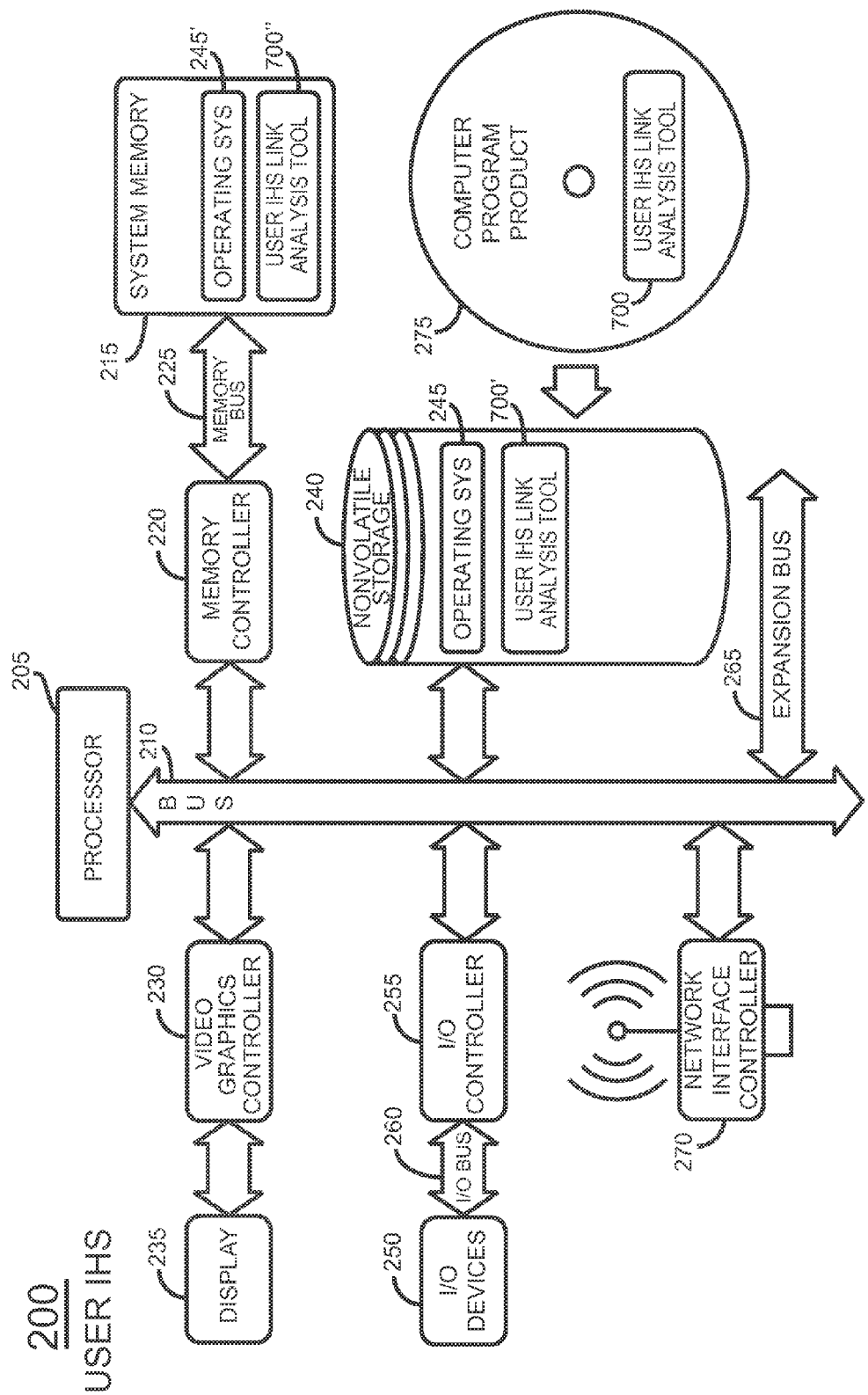
FIG. 2 is a block diagram of the disclosed user information handling system (IHS) including a user IHS link analysis tool.

FIG. 2 is a block diagram of a user information handling system (IHS) 200 that employs the disclosed user IHS link analysis tool methodology to prevent navigation on an undesired network. User IHS 200 includes a processor 205 that may include multiple cores. User IHS 200 processes, transfers, communicates, modifies, stores or otherwise handles information in digital form, analog form or other form. User IHS 200 includes a bus 210 that couples processor 205 to memory 215 via a memory controller 220 and memory bus 225. System memory 215 may also be referred to as main memory. System memory 215 may be a static random access memory (SRAM) array or a dynamic random access memory (DRAM) array. Processor 205 may also include local memory such as L1, L2 and L3 caches. A video graphics controller 230 couples display 235 to bus 210. Nonvolatile storage 240, such as a hard disk drive, solid state drive (SSD), CD drive, DVD drive, or other nonvolatile storage couples to bus 210 to provide user IHS 200 with permanent storage of information. System memory 215 and nonvolatile storage 240 are both forms of memory stores. Nonvolatile storage 240 stores an operating system 245 (OPERATING SYS) that governs operation of user IHS 200. I/O devices 250, such as a keyboard and a pointing device, couple to bus 210 via I/O controller 255 and I/O bus 260. I/O devices 250 may also include, but are not limited to: capacitive sensors, image sensors, audio input devices, touchscreen devices, video devices, and stereographic devices.

One or more expansion busses 265, such as USB, IEEE 1394 bus, ATA, SATA, PCI, PCIE, DVI, HDMI and other busses, couple to bus 210 to facilitate the connection of peripherals and devices to user IHS 200. A network interface controller 270 couples to bus 210 to enable user IHS 200 to connect by wire or wirelessly to a network and other information handling systems. Network interface controller 270 may also be called a network communication adapter or a network adapter. While FIG. 2 shows one IHS that employs processor 205, the IHS may take many forms. For example, user IHS 200 may take the form of a desktop, server, portable, laptop, notebook, tablet, or other form factor computer or data processing system. User IHS 200 may take other form factors such as a gaming device, a personal digital assistant (PDA), a portable telephone device, a communication device or other devices that include a processor and memory.

User IHS 200 includes a user IHS link analysis tool computer program product 700 on digital media 275 such as a CD, DVD or other media. In one embodiment, user IHS link analysis tool 700 is within user IHS 200 as shown in FIG. 1. User IHS link analysis tool 700 may also be an add-in that the user or other entity installs in user IHS 200 at the user's convenience. In actual practice, user IHS 200 may store user IHS link analysis tool 700 in nonvolatile storage 240 as user IHS link analysis tool 700'. User IHS 200 may also store operating system 245 (OPERATING SYS) in nonvolatile storage 240. When user IHS 200 initializes, the IHS loads operating system 245 into system memory 215 for execution as operating system 245'. User IHS 200 also loads user IHS link analysis tool 700' into system memory 215 for execution as user IHS link analysis tool 700", respectively.

Figure 3:
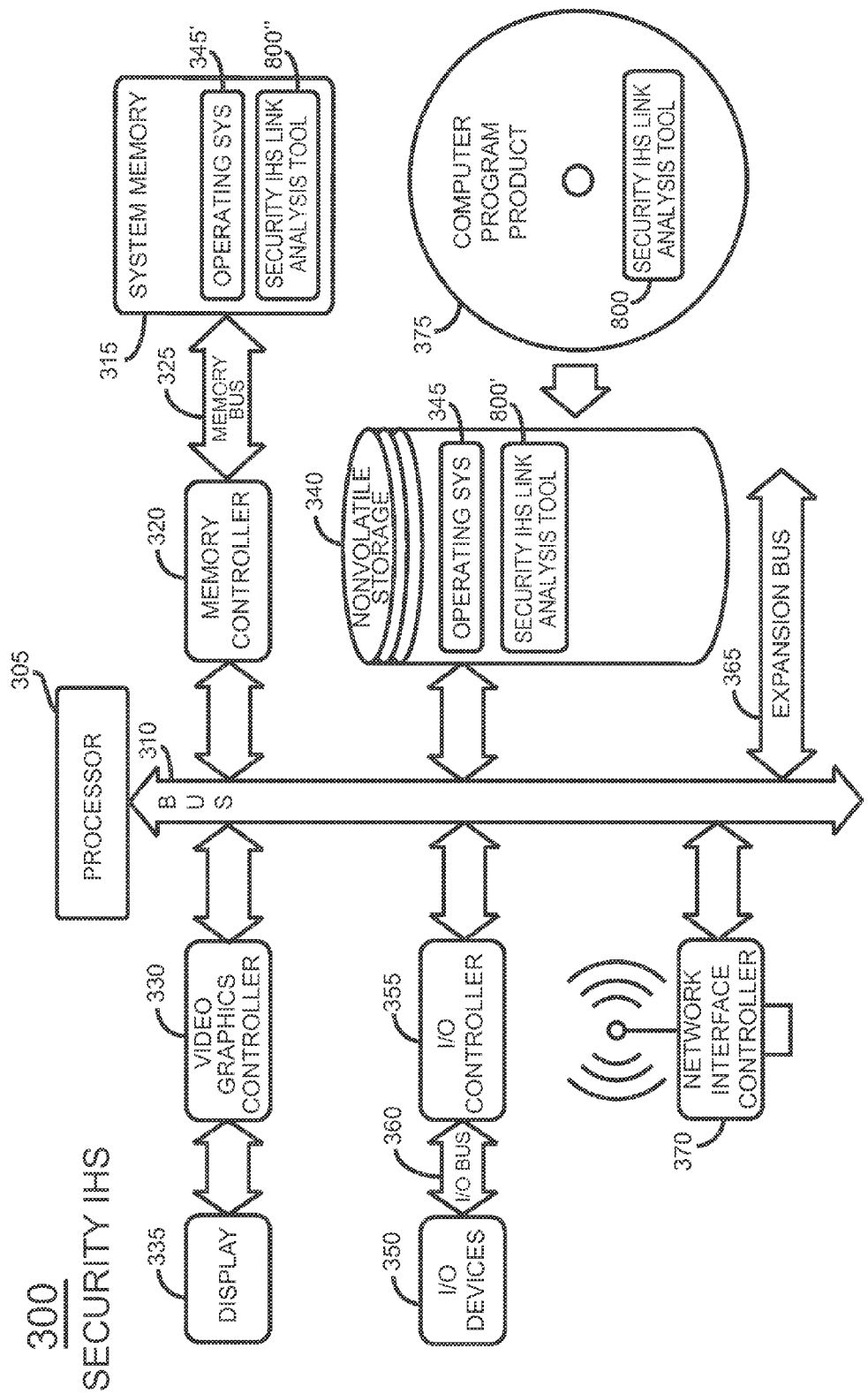
FIG. 3 is a block diagram of the disclosed security IHS including a security IHS link analysis tool.

FIG. 3 is a block diagram of a security information handling system (IHS) 300 that employs the disclosed security IHS link analysis tool methodology to determine which networks should be utilized based upon the content of the link. Security IHS 300 includes a processor 305 that may include multiple cores. Security IHS 300 processes, transfers, communicates, modifies, stores or otherwise handles information in digital form, analog form or other form. Security IHS 300 includes a bus 310 that couples processor 305 to memory 315 via a memory controller 320 and memory bus 325. System memory 315 may also be referred to as main memory. System memory 315 may be a static random access memory (SRAM) array or a dynamic random access memory (DRAM) array. Processor 305 may also include local memory such as L1, L2 and L3 caches. A video graphics controller 330 couples display 335 to bus 310. Nonvolatile storage 340, such as a hard disk drive, solid state drive (SSD), CD drive, DVD drive, or other nonvolatile storage couples to bus 310 to provide security IHS 300 with permanent storage of information. System memory 315 and nonvolatile storage 340 are both forms of memory stores. Nonvolatile storage 340 stores an operating system 345 (OPERATING SYS) that governs operation of security IHS 300. I/O devices 350, such as a keyboard and a pointing device, couple to bus 310 via I/O controller 355 and I/O bus 360. I/O devices 350 may also include, but are not limited to: capacitive sensors, image sensors, audio input devices, touchscreen devices, video devices, and stereographic devices.

One or more expansion busses 365, such as USB, IEEE 1394 bus, ATA, SATA, PCI, PCIE, DVI, HDMI and other busses, couple to bus 310 to facilitate the connection of peripherals and devices to security IHS 300. A network interface controller 370 couples to bus 310 to enable security IHS 300 to connect by wire or wirelessly to a network and other information handling systems. Network interface controller 370 may also be called a network communication adapter or a network adapter. While FIG. 3 shows one IHS that employs processor 305, the IHS may take many forms. For example, security IHS 300 may take the form of a desktop, server, portable, laptop, notebook, tablet, or other form factor computer or data processing system. Security IHS 300 may take other form factors such as a gaming device, a personal digital assistant (PDA), a portable telephone device, a communication device or other devices that include a processor and memory.

Security IHS 300 includes a security IHS link analysis tool computer program product 800 on digital media 375 such as a CD, DVD or other media. In one embodiment, security IHS link analysis tool 800 is within security IHS 300 as shown in FIG. 1. Security IHS link analysis tool 800 may also be an add-in that the user or other entity installs in security IHS 300 at the user's convenience. In actual practice, security IHS 300 may store security IHS link analysis tool 800 in nonvolatile storage 340 as security IHS link analysis tool 800'. Security IHS 300 may also store operating system 345 (OPERATING SYS) in nonvolatile storage 340. When security IHS 300 initializes, the IHS loads operating system 345 into system memory 315 for execution as operating system 345'. Security IHS 300 also loads security IHS link analysis tool 800' into system memory 315 for execution as security IHS link analysis tool 800", respectively.

Figure 4:
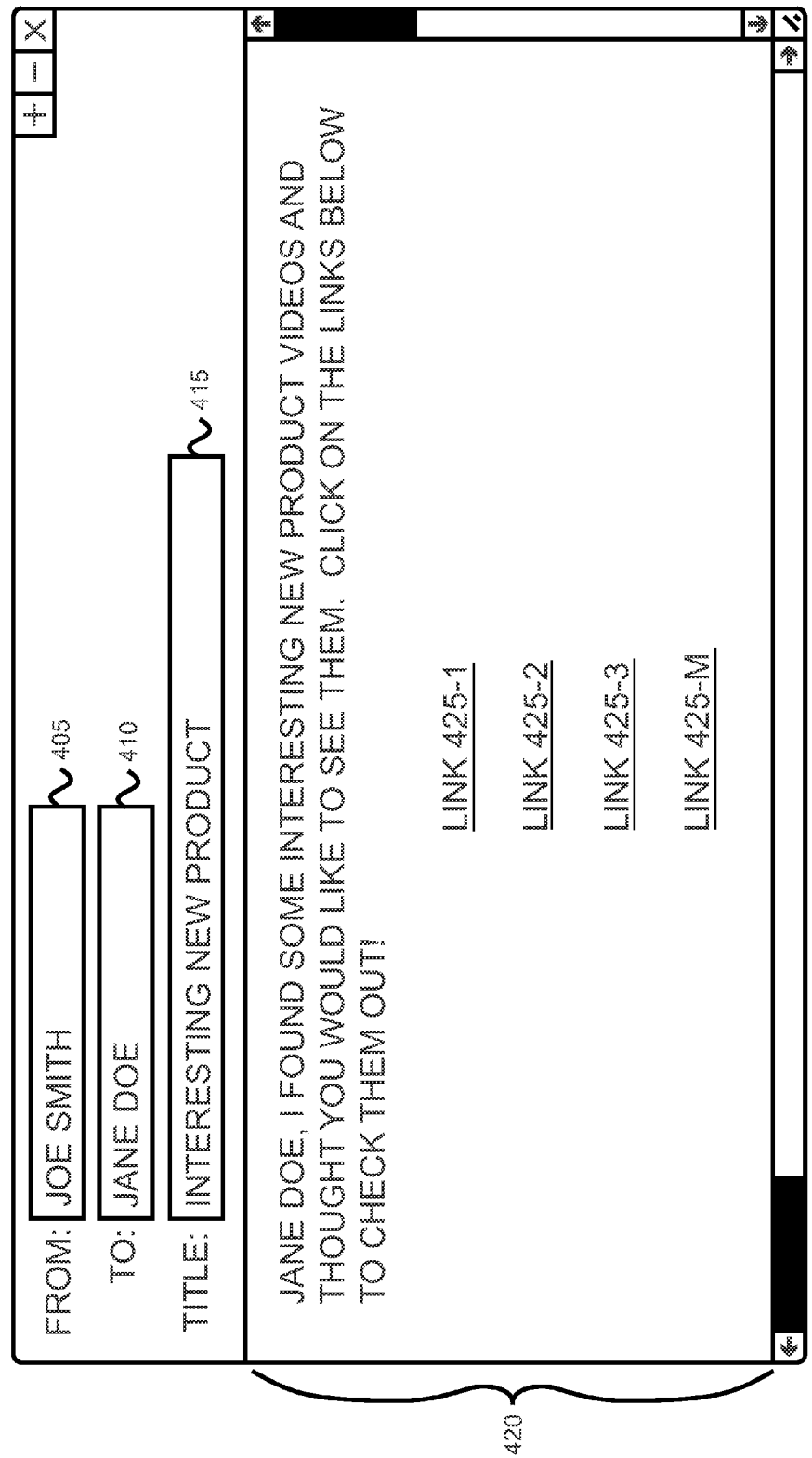
FIG. 4 shows a representative email in that the disclosed user IHS link analysis tool may employ.

FIG. 4 shows an example of an email message 400 that user IHS 200 may display on display 235. An email message may include a FROM field 405, a TO field 410, a TITLE field 415 and a message field 420. In one embodiment, the message field 420 may include a message to the user and links such as link 425-1, link 425-2, link 425-3, . . . , link 425-M. These links, namely link 425-1, link 425-2, link 425-3, . . . , link 425-M, may be links to webpages. For example, link 425-1 may be a link to webpage 525.

In one scenario, the user may select link 425-1. User IHS link analysis tool 700 intercepts the request to navigate to webpage 525, the target of link 425-1. The user IHS link analysis tool 700 may generate a navigation request. In one embodiment, the navigation request may contain link 425-1, the current location time at user IHS 200, and a list of networks available to user IHS 200, namely: trusted network 105, non-secure network 115-1, non-secure network 115-2, . . . , non-secure network 115-M. The user IHS link analysis tool 700 may transmit the navigation request through trusted network 105, via the Internet 110, to security IHS 300. The user IHS 200 and security IHS 300 may communication with one another, back and forth, via the Internet 110, and trusted network 105.

Figure 5:
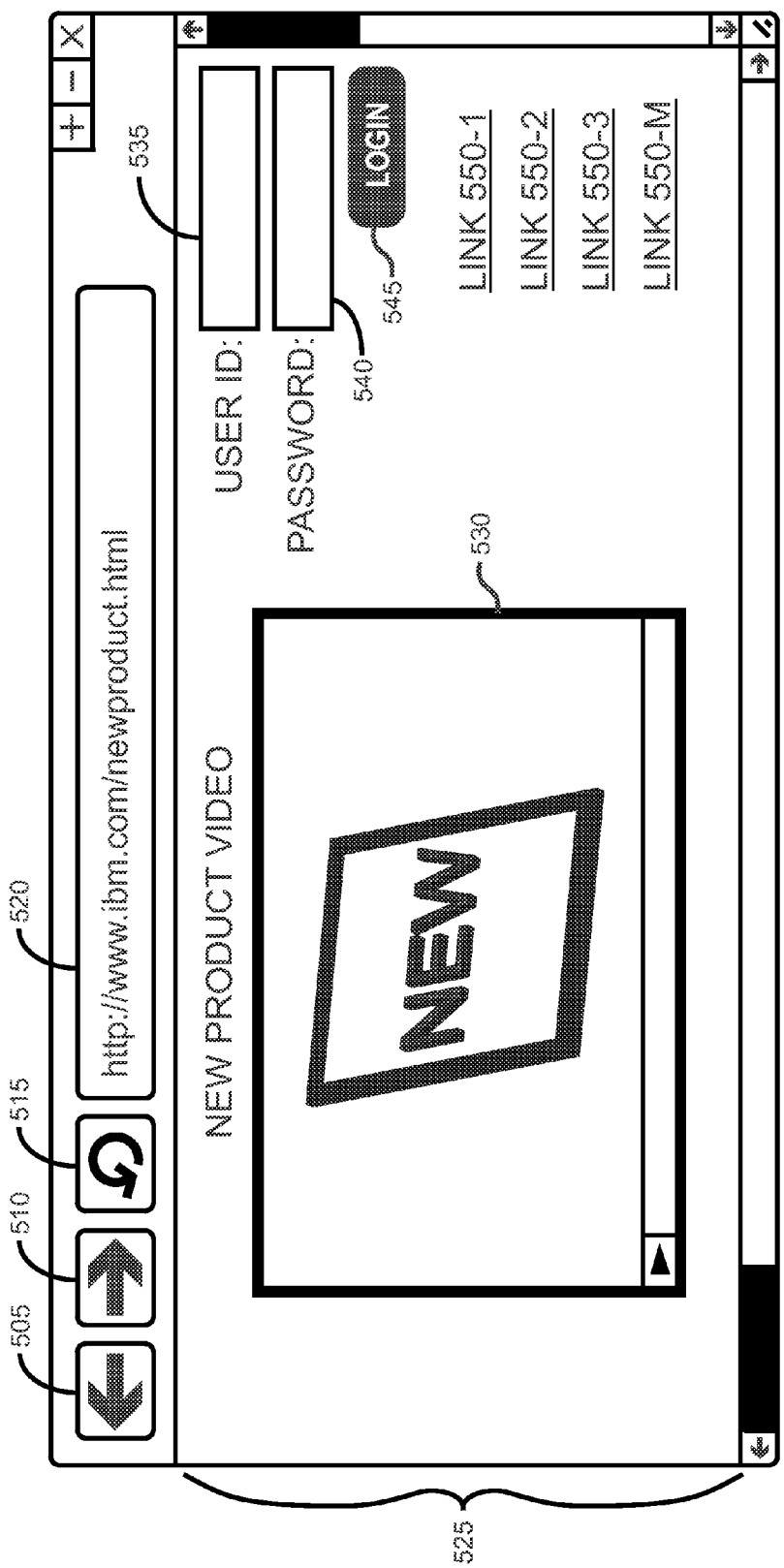
FIG. 5 shows a representative webpage in that the disclosed security IHS link analysis tool may employ.

FIG. 5 shows an example of a webpage 525 that link 425-1 may target. In one embodiment, the security IHS link analysis tool 800 receives the navigation request and navigates to the target of link 425-1, namely webpage 525. FIG. 5 shows an example of a webpage 525 in a browser 500 that security IHS 300 may display on display 335. Browser 500 may include a backward button 505, forward button 510, refresh button 515 and a uniform resource locator (URL) field 520.

In one embodiment, security IHS link analysis tool 800 parses the webpage 525 and URL field 520 for content. Security IHS link analysis tool 800 may accumulate content and determine to which user-defined category or categories the content belongs. For example, security IHS link analysis tool 800 may parse URL field 520 for content. In this scenario, 'http' indicates an unsecure hypertext transport protocol communication. Other types of communication may be, hypertext transfer protocol over secure socket layer (HTTPS), file transfer protocol (FTP), secure shell file transfer protocol (SFTP) and others. Security IHS link analysis tool 800 may determine this content belongs to a user-defined category, "unsecure communication."

Security IHS link analysis tool 800 may also parse 'ibm.com' of URL field 520 as content and may further determine that this content belongs to multiple user-defined categories such as "trusted websites", "business" and "commerce". Security IHS link analysis tool 800 may parse 'newproduct.html' as content and may further determine that this content does not belong to a user-defined category. In response to this determination, security IHS link analysis tool 800 may transmit an instruction to the user IHS 200 instructing the user IHS link analysis tool 700 to generate a dialog box to notify the user that this particular content is not currently categorized. The user may or may not respond by selecting an appropriate category for this content, or by creating a new category for this content. The user IHS link analysis tool 700 may transmit the user's response to security IHS 300.

In another embodiment, based upon user settings, i.e. preferences, the security IHS link analysis tool 800 may determine that 'newproduct.html' does not belong to a user-defined category and, in response to this determination, may flag the content for later review by the user for categorization.

In another embodiment, based upon user settings, the security IHS link analysis tool 800 may determine that 'newproduct.html' does not belong to a user-defined category. However, in this embodiment, security IHS link analysis tool 800 may use past browsing history, time of previous access to similar content, similar content which has been categorized, and other factors to determine an appropriate category for the content. In this scenario, the security IHS link analysis tool 800 may autonomously determine a category for the content without user intervention.

Security IHS link analysis tool 800 may parse new product video 530 as content and determine it belongs to multiple categories: "advertisement" and "high-bandwidth video". Security IHS link analysis tool 800 may parse user ID 535, password 540, and login 545 as content and determine they belong to category "user login website". Security IHS link analysis tool 800 may also determine that password 540 does not use a proper hypertext markup language (HTML) form field and as content belongs to category "security risk" as well as "user login website".

Security IHS link analysis tool 800 may parse link 550-1, link 550-2, link 550-3, . . . , link 550-M and determine some, or all parts of the link 550-1, link 550-2, link 550-3, . . . , link 550-M constitute content and belong to categories. For example, link 550-1 may link to "www.medicalsupply.com/newproduct.html". Security IHS link analysis tool 800 may parse "medicalsupply.com" as content and may further determine that this content belongs to multiple categories, such as "medical" and "business". Security IHS link analysis tool 800 may parse "newproduct.html" as content, determine that this content is similar to "newproduct.html" from URL field 520 and identify the content as belonging to the same category as the content from "newproduct.html" from URL field 520, as discussed above. Identifying each content portion and appending each content portion to one or more categories is discussed in more detail below with respect to TABLE 1.

Security IHS link analysis tool 800 may parse additional data, but is not limited to the examples above, wherein portions of webpage 525 may be hidden to the user, such as metadata, image tags, and other data. In one embodiment, security IHS link analysis tool 800, based on user settings, assesses the respective weights of categories and the number of instance of those categories identified on webpage 525 and determines a sensitivity level of webpage 525 in accordance with those user settings. The security IHS link analysis tool determines the sensitivity level which may be a number greater than or equal to 0 but less than or equal to 1. Security IHS link analysis tool 800, based upon a user-defined sensitivity threshold and the determined sensitivity level of webpage 525, generates a network selection message. The user-defined sensitivity threshold may be a number greater than or equal to 0 but less than or equal to 1 and is discussed in more detail below with reference to TABLE 2. The network selection message includes the suggested network to be used for navigation by user IHS 200.

Referring now to TABLE 1, the user may define a weight for a category to increase with the perceived sensitivity or importance of the category. For example, a user wishing to only browse medical information on a trusted network may assign the maximum weight, in this case "1", to the "MEDICAL" category, as shown in TABLE 1.

TABLE 1

| CATEGORY | WEIGHT | NUMBER OF INSTANCES |
| --- | --- | --- |
| MEDICAL | 1 | 1 |
| BUSINESS | 0 | 3 |
| SOCIAL | 0.6 | 13 |

In this scenario, security IHS link analysis tool 800 may determine that the presence of the "MEDICAL" category would be above the user-defined sensitivity threshold and therefore garner the maximum sensitivity level. The security IHS link analysis tool 800 may generate a network selection message that the trusted network 105, namely the default network with the highest sensitivity threshold, be used by the user IHS 200 to navigate to webpage 525. In one embodiment, trusted network 105 exhibits the highest security of networks available to user IHS 200 for communication with other IHSs such as an IHS hosting a webpage on the Internet.

In another example, a user unconcerned with browsing information relating to business on a secure network may assign the minimum weight, in this case "0", to the "BUSINESS" category, as shown in TABLE 1 above. The user may be concerned with browsing information relating to social media on a secure network, and may assign a weight of "0.6" to the "SOCIAL" category, as shown in TABLE 1. In this scenario, security IHS link analysis tool 800 may determine that the presence of the "SOCIAL" category may not be above the user-defined sensitivity threshold and therefore not garner the maximum sensitivity level. The security IHS link analysis tool 800 may generate a network selection message that the non-secure network 115-1, a network below the sensitivity threshold, be used by the user IHS 200 to navigate to webpage 525.

In another example, the security IHS link analysis tool 800 parses webpage 525 and determines that one (1) content portion belongs to the "MEDICAL" category. The security IHS link analysis tool 800 may append "1" as the "NUMBER OF INSTANCES" in the "MEDICAL" row of TABLE 1. The security IHS link analysis tool 800 may determine that 3 content portions belong to the "BUSINESS" category. The security IHS link analysis tool 800 may append "3" as the "NUMBER OF INSTANCES" in the "BUSINESS" row of TABLE 1. The security IHS link analysis tool 800 may determine that 13 content portions belong to the "SOCIAL" category. The security IHS link analysis tool 800 may append "13" as the "NUMBER OF INSTANCES" in the "SOCIAL" row of TABLE 1. Each time that the security IHS link analysis tool 800 determines that a content portion belongs to a category, the security IHS link analysis tool 800 increments the "NUMBER OF INSTANCES" of that category by one (1).

In one embodiment, the user may set individual sensitivity thresholds on a per network basis. For example, a user may set a sensitivity threshold of "0.9" for trusted network 105, a sensitivity threshold of "0.75" for non-secure network 115-1, and a sensitivity threshold of "0.5" for non-secure network 115-2, such as shown in TABLE 2 below. The security IHS link analysis tool 800, based upon a user-defined sensitivity threshold and the determined sensitivity level of webpage 525 generates a network selection message.

TABLE 2

| NETWORKS | SENSITIVITY THRESHOLDS |
| --- | --- |
| trusted network 105 | 0.9 |
| non-secure network 115-1 | 0.75 |
| non-secure network 115-2 | 0.5 |

In another embodiment, the user may set SENSITIVITY THRESHOLDS for GROUPS of NETWORKS as shown in TABLE 3 below. A user may set the SENSITIVITY THRESHOLD for group G1 to "0.95". The SENSITIVITY THRESHOLD for trusted network 105 may then be set to "0.95". A user may set the SENSITIVITY THRESHOLD for group G2 to "0.6". The SENSITIVITY THRESHOLD for non-secure network 115-1 and non-secure network 115-2 may then be set to "0.6". A user may set the SENSITIVITY THRESHOLD for group G3 to "0.2". The SENSITIVITY THRESHOLD for non-secure network 115-M may then be set to "0.2". The security IHS link analysis tool 800, based upon a user-defined sensitivity threshold and the determined sensitivity level of webpage 525 generates a network selection message.

TABLE 3

| GROUPS | NETWORKS | SENSITIVITY THRESHOLDS |
| --- | --- | --- |
| G1 | trusted network 105 | 0.95 |
| G2 | non-secure network 115-1, non-secure network 115-2 | 0.6 |
| G3 | non-secure network 115-M | 0.2 |

In another embodiment, the user may set a time period for which an individual network, or group of networks, exhibits different sensitivity thresholds. For example, a user may set a sensitivity threshold of "0.9" for trusted network 105. In this scenario, the user may set the sensitivity threshold for trusted network 105 to be "0.7" during the local hours of user IHS 200 from 8:00 to 17:00, i.e. a time period.

In another embodiment, the user may set a time period for which a category exhibits different weights. For example, a user may set a weight of "0.3" for category "SOCIAL". In this scenario, the user may set the weight for category "SOCIAL" to be "0.7" during the local hours of user IHS 200 from 8:00 to 15:00, i.e. a time period.

In another embodiment, the user may change the default link depth option from "0" to one of "1", "2", "3", . . . , "M". "Link depth" refers to how many levels of links the security IHS link analysis tool 800 navigates to and analyzes. With a link depth of "0", the security IHS link analysis tool 800 may analyze only the target of the link and not further. With a link depth of "1", the security IHS link analysis tool 800 may analyze the target of the link and the targets of the target of the link. With a link depth of "2", the security IHS link analysis tool 800 may analyze the target of the link, the targets of the target of the link, and the targets of the targets of the target of the link, and so on according to increasing link depth. In this scenario, the user increases the link depth option from "0" to "1". The security IHS analysis tool 800 responds by navigating to not only webpage 525 to parse for content, but also by navigating to the target of link 550-1, link 550-2, link 550-3, . . . , link 550-M to parse for content. Link 550-1, link 550-2, link 550-3, . . . , link 550-M are 1 link depth away from webpage 525. With the link depth set to "1", the security IHS link analysis tool 800, based upon a user-defined sensitivity threshold and the determined sensitivity level of webpage 525, link 550-1, link 550-2, link 550-3, . . . , link 550-M generates a network selection message. The network selection message includes the suggested network to be used for navigation by user IHS 200.

Figure 6:
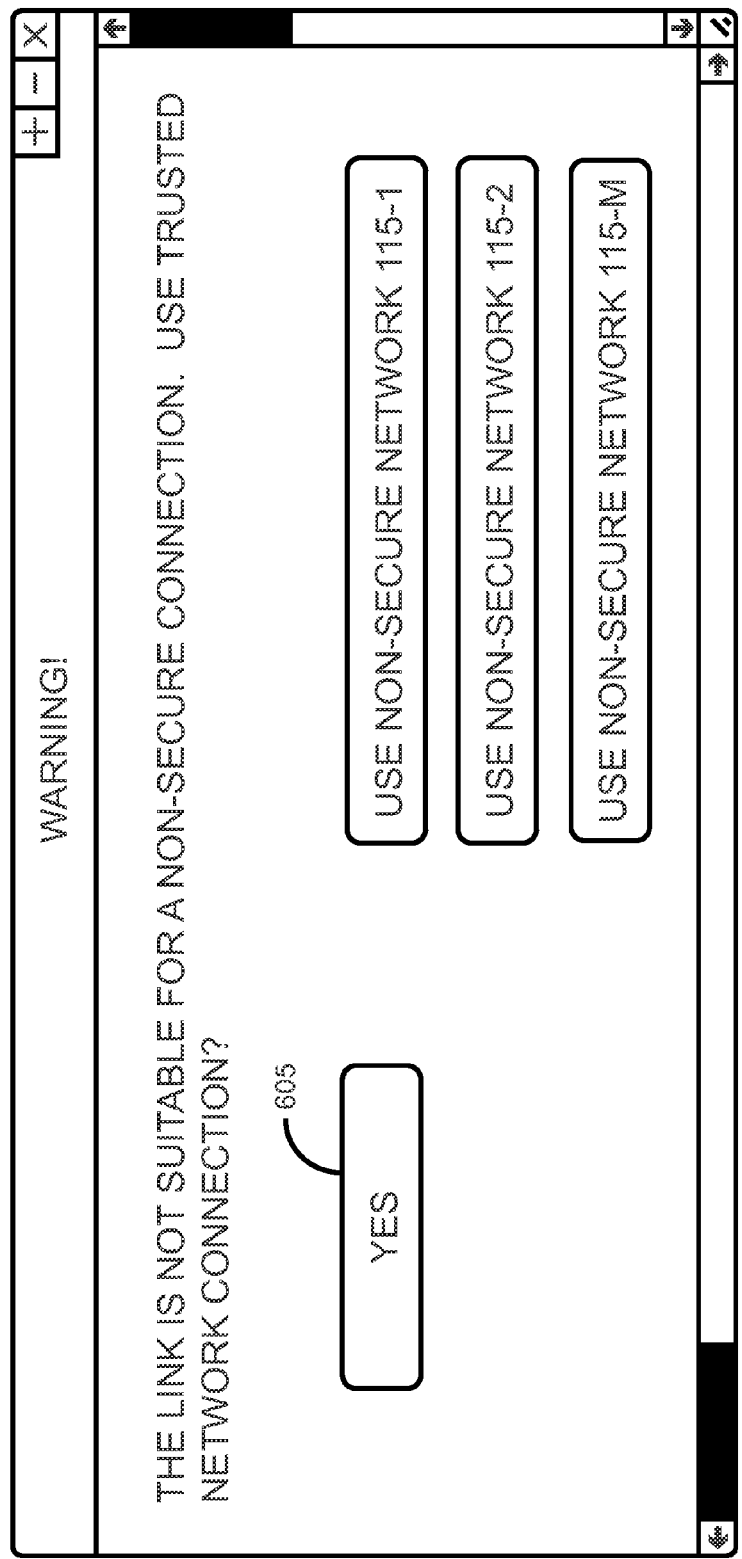
FIG. 6 shows a representative override network selection message prompt that the disclosed user IHS link analysis tool may generate.

Security IHS link analysis tool 800 transmits a network selection message, via internet 110, through trusted network 105, to user IHS 200. User IHS link analysis tool 700 of user IHS 200 receives the network selection message and may generate an override network selection message prompt 600. FIG. 6 shows an example of an override network selection message prompt 600 that user IHS 200 may display on display 235. In this scenario, the network selection message suggests that the content on webpage 525 is sensitive, and should be navigated to using trusted network 105. Override network selection message prompt 600 displays information indicating that the link to be navigated to is not suitable for a non-secure connection.

If the user selects YES button 605, user IHS link analysis tool 700 navigates to webpage 525 through trusted network 105. However, if the user selects USE NON-SECURE NETWORK 115-1, user IHS link analysis tool 700 navigates to webpage 525 through non-secure network 115-1. If the user selects USE NON-SECURE NETWORK 115-2, user IHS link analysis tool 700 navigates to webpage 525 through non-secure network 115-2. If the user selects USE NON-SECURE NETWORK 115-M, user IHS link analysis tool 700 navigates to webpage 525 through non-secure network 115-M.

In another embodiment, the user IHS link analysis tool 700 may transmit a response to security IHS 300 through trusted network 105, via Internet 110. The response may include the user's selection of whether or not to override the network selection message and which network was selected for navigation. Security IHS link analysis tool 800 may use some or all information available, including but not limited to, past user decisions, time of decisions, available networks, content accessed, categories and more to choose the appropriate network.

In another embodiment, after transmitting the network selection message to the user IHS 200, the security IHS link analysis tool 800 may prefetch additional content. It is likely that after navigating to webpage 525, the user may decide to select one of link 550-1, link 550-2, link 550-3, ... link 550-M to navigate to next. The security IHS analysis tool 800 responds by navigating to the target of link 550-1, link 550-2, link 550-3, ..., link 550-M to parse the targets for content. Security IHS link analysis tool 800, based upon a user-defined sensitivity threshold and the determined sensitivity level of link 550-1, link 550-2, link 550-3, ... link 550-M generates a network selection message for each link. Each network selection message includes the suggested network to be used for navigation by user IHS 200 in the event that the user selects one of those links for future navigation. The above actions may speed up processing time as perceived by the user of user IHS 200, by effectively anticipating the next link clicked by the user. Depending on user settings, security IHS link analysis tool 800 may prefetch content N levels deep, wherein N is an integer. For example, one level deep (N=1), corresponds to the security IHS link analysis tool 800 prefetching additional content of the targets of the target of the link. Two levels deep (N=2), corresponds to the security IHS link analysis tool 800 prefetching additional content of the targets of targets of the target of the link.

In another embodiment, multiple users may use the disclosed network selection system 100. For example, multiple users User A, User B, User C, and User D may use network selection system 100. User A and User B both configured security IHS link analysis tool 800 to suit their respective network needs. User C may instruct security IHS link analysis tool 800 to use settings similar to those User A uses, but not similar to those User B uses. User D may instruct security IHS link analysis tool 800 to use settings similar to those of User B, but not similar to those of User A.

Figure 7:
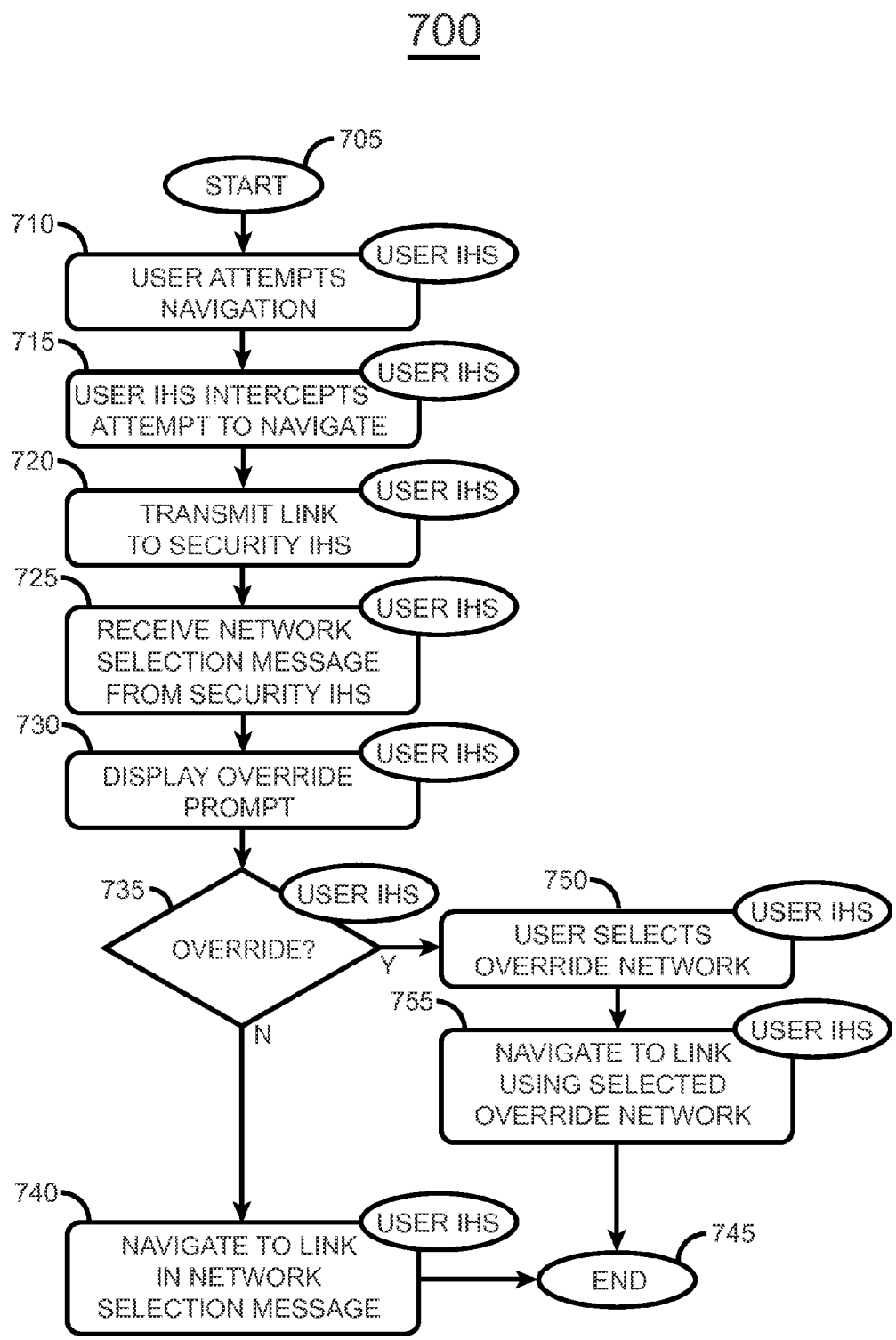
FIG. 7 is a flowchart of process flow in the disclosed user IHS link analysis tool.

FIG. 7 is a flowchart that shows process flow of the user IHS link analysis tool 700 that executes on user IHS 200 in cooperation with security IHS link analysis tool 800 that executes on security IHS 300. Process flow commences when user IHS 200 initializes and launches user IHS link analysis tool 700, as per start block 705. The user attempts to attempt to navigate, for example, to webpage 525, that is the target of link 425-1, as per block 710. The user IHS link analysis tool 700 intercepts the user's attempt to navigate, as per block 715. The user IHS link analysis tool 700 may transmit the link to security IHS 300 through trusted network 105, via the Internet 110, as per block 720.

The user IHS 200 receives a network selection message from security IHS 300 via the Internet, through trusted network 105. The user IHS link analysis tool 700 intercepts the network selection message, as per block 725. The user IHS link analysis tool 700 displays, for example, an override network selection message prompt 600 on display 235, that informs the user of the indicated network and other network choices, as per block 730. The user may choose to select the indicated network or override and choose another network, as per decision block 735. If the user does not override the network selection message, as per decision block 735, the user IHS link analysis tool 200 navigates to the target of the link using the indicated network, as per block 740. After navigating to the link by using the indicated network, as per block 740, the process flow may end, as per block 745. Alternatively, process flow may continue back to start block 705 and the process starts anew.

However, if the user chooses to override the indicated network, as per decision block 735, the user selects which network to use, as per block 745. The user IHS link analysis tool 700 navigates to the target of the selected link using the selected network, as per block 750. After navigating to the link using the indicated network, as per block 750, the process flow may end, as per block 745. Alternatively, process flow may continue back to start block 705 and the process starts anew.

Figure 8:
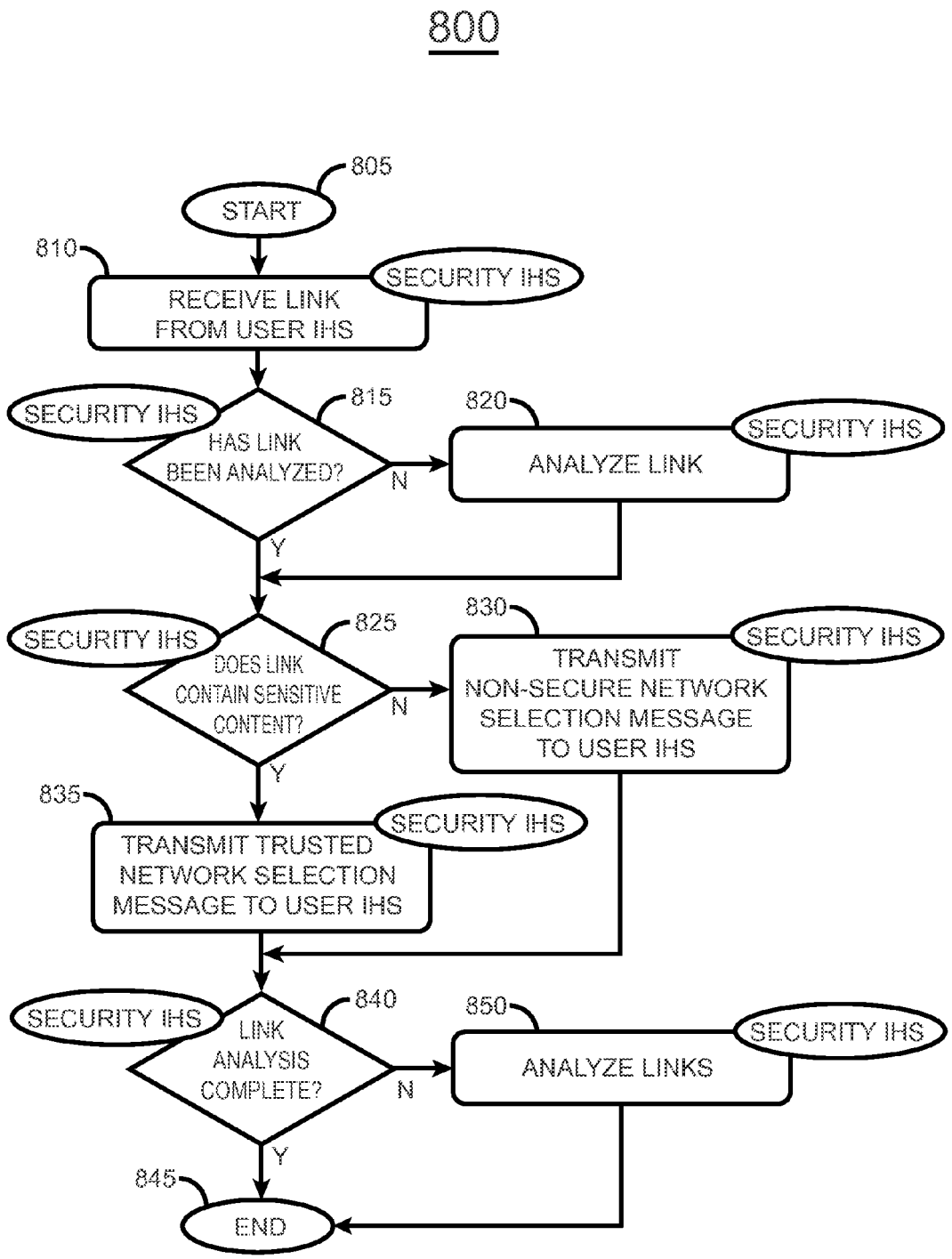
FIG. 8 is a flowchart of process flow in the disclosed security IHS link analysis tool.

FIG. 8 is a flowchart that shows process flow of the security IHS link analysis tool 800 when it executes on security IHS 300 in cooperation with user IHS link analysis tool 700 that executes on security IHS 200. Process flow commences when security IHS 300 initializes and launches security IHS link analysis tool 800, as per start block 805. Security IHS link analysis tool 800 of security IHS 300 may receive a link from user IHS 200 via the Internet, over trusted network 105, as per block 810.

Security IHS link analysis tool 800 conducts a test to determine if the link was analyzed previously, as per decision block 815. If the link was not previously analyzed, security IHS link analysis tool 800 analyzes the link for content, as per block 820. If the link was previously analyzed for content, security IHS link analysis tool 800 determines if the link contains sensitive content, namely content above the sensitivity threshold, as per decision block 825. If the security IHS link analysis tool 800 determines that the link does not contain sensitive content, the security IHS link analysis tool may transmit a network selection message to the user IHS 200 that indicates that user IHS 200 may use a non-secure network, as per block 830.

If the security IHS link analysis tool 800 determines that the link does contain sensitive content, the security IHS link analysis tool may transmit a network selection message to the user IHS 200 that user IHS 200 may use trusted network 105, as per block 835. The security IHS link analysis tool 800 determines if any more links need to be analyzed, per user settings, as per block 840. If security IHS link analysis tool 800 determines that link analysis is complete, process flow ends, as per block 845. If security IHS link analysis tool 800 determines that link analysis is not complete, security IHS link analysis tool 800 analyzes the remaining links, per user settings, as per block 850. After security IHS link analysis tool 800 has analyzed the links, process flow ends, as per block 845. Alternatively, process flow may continue back to start block 805 and the process starts anew.

As will be appreciated by one skilled in the art, aspects of the disclosed methodology may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the FIGS. 7 and 8 flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts of FIGS. 7 and 8 and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowcharts of FIGS. 7 and 8 described above.

The flowcharts of FIGS. 7 and 8 illustrate the architecture, functionality, and operation of possible implementations of systems, methods and computer program products that perform network analysis in accordance with various embodiments of the present invention. In this regard, each block in the flowcharts of FIGS. 7 and 8 may represent a module, segment, or portion of code, which comprises one or more executable instructions for implementing the specified logical function(s). It should also be noted that, in some alternative implementations, the functions noted in the block may occur out of the order noted in FIGS. 7 and 8. For example, two blocks shown in succession may, in fact, be executed substantially concurrently, or the blocks may sometimes be executed in the reverse order, depending upon the functionality involved. It will also be noted that each block of FIGS. 7 and 8 and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A security information handling system (IHS), comprising:
   a processor:
   a memory, coupled to the processor, the memory being configured with a security IHS link analysis tool to:
   receive a navigation request from a user IHS, the navigation request including a link;
   determine if a target of the link includes sensitive content;
   generate a non-secure network selection message if the target of the link is determined to not include sensitive content, wherein the non-secure network selection message designates a particular non-secure network for communication between the security IHS and the user IHS, and
   generate a trusted network selection message if the target of the link is determined to include sensitive content, wherein the trusted network selection message designates a trusted network for communication between the security IHS and the user IHS.

2. The security IHS of claim 1, wherein the memory is further configured to transmit the non-secure network selection message to the user IHS via the trusted network if the target of the link is determined to not include sensitive content.

3. The security IHS of claim 2, wherein the memory is further configured to transmit the trusted network selection message to the user IHS via the trusted network if the target of the link is determined to include sensitive content.

4. The security IHS of claim 3, wherein the memory is further configured to designate respective sensitivity thresholds to the non-secure networks and the trusted network.

5. The security IHS of claim 4, wherein the memory is further configured to determine a particular network for user IHS navigation based on a sensitivity level of the target of the link, and if the sensitivity level of the target of the link exceeds a sensitivity threshold corresponding to the particular network, then the particular network at that sensitivity threshold or a network of higher sensitivity threshold is designated for navigation.

6. The security IHS of claim 1, wherein the memory is further configured to parse the target of the link to determine a plurality of content portions in the target of the link.

7. The security IHS of claim 6, wherein the memory is further configured to determine at least one category for each of the plurality of content portions.

8. The security IHS of claim 7, wherein the memory is further configured to apply user-defined weights to respective categories.

9. The security IHS of claim 1, wherein the memory is further configured to determine if a target of the link includes sensitive content by determining if a target of the target of the link includes sensitive content.

10. The security IHS of claim 1, wherein the memory is further configured to assign a plurality of sensitivity levels to a plurality of targets of the target of the link, respectively.

11. A security IHS link analysis tool computer program product, comprising:
    a non-transitory computer readable storage medium;
    first instructions that receive a navigation request from a user IHS, the navigation request including a link;
    second instructions that determine if a target of the link includes sensitive content;
    third instructions that generate a non-secure network selection message if the target of the link is determined to not include sensitive content, wherein the non-secure network selection message designates a particular non-secure network for communication between the security IHS and the user IHS; and
    fourth instructions that generate a trusted network selection message if the target of the link is determined to include sensitive content, wherein the trusted network selection message designates a trusted network for communication between the security IHS and the user IHS;
    wherein the first, second third and fourth instructions are on the non-transitory computer readable storage medium.

12. The security IHS link analysis tool computer program product of claim 11 further comprising fifth instructions that transmit the non-secure network selection message to the user IHS via the trusted network if the target of the link is determined to not include sensitive content.

13. The security IHS link analysis tool computer program product of claim 12 further comprising sixth instructions that transmit the trusted network selection message to the user IHS via the trusted network if the target of the link is determined to include sensitive content.

14. The security IHS link analysis tool computer program product of claim 13 further comprising seventh instructions that designate respective sensitivity thresholds to the non-secure networks and the trusted network.

15. The security IHS link analysis tool computer program product of claim 14 further comprising eighth instructions that determine a particular network for user IHS navigation based on a sensitivity level of the target of the link, and if the sensitivity level of the target of the link exceeds a sensitivity threshold corresponding to the particular network, then the particular network at that sensitivity threshold or a network of higher sensitivity threshold is designated for navigation.

* * * * *